(12) United States Patent
Hain et al.

(10) Patent No.: US 9,737,801 B2
(45) Date of Patent: Aug. 22, 2017

(54) SYSTEM AND METHOD FOR PROVIDING A SOFTWARE APPLICATION CONTROLLER

(71) Applicant: DingMedia, Ltd., Feltham (GB)

(72) Inventors: Robert Hain, Limassol (CY); Svetlana Astakhova, Limassol (CY); Maksym Gutchenko, Limassol (CY)

(*) Notice: Subject to any disclaimer, the term of this patent is extended or adjusted under 35 U.S.C. 154(b) by 103 days.

(21) Appl. No.: 14/624,147

(22) Filed: Feb. 17, 2015

(65) Prior Publication Data

US 2015/0231493 A1 Aug. 20, 2015

Related U.S. Application Data

(60) Provisional application No. 61/940,816, filed on Feb. 17, 2014.

(51) Int. Cl.
| | | |
|---|---|---|
| *A63F 13/30* | (2014.01) | |
| *A63F 13/26* | (2014.01) | |
| *A63F 13/23* | (2014.01) | |
| *A63F 13/323* | (2014.01) | |
| *A63F 13/424* | (2014.01) | |

(52) U.S. Cl.
CPC ............ *A63F 13/26* (2014.09); *A63F 13/23* (2014.09); *A63F 13/323* (2014.09); *A63F 13/424* (2014.09)

(58) Field of Classification Search
CPC .......... A63F 13/20; A63F 13/22; A63F 13/23; A63F 2300/10; A63F 2300/1018; A63F 13/26; A63F 13/323; A63F 13/424
USPC .......................................................... 463/35
See application file for complete search history.

(56) References Cited

U.S. PATENT DOCUMENTS

| | | | | |
|---|---|---|---|---|
| 8,128,476 | B1* | 3/2012 | Sidhu | A63F 3/00643 463/10 |
| 2007/0249422 | A1* | 10/2007 | Podoloff | G06F 3/0219 463/43 |
| 2008/0119290 | A1* | 5/2008 | Lee | A63F 13/02 463/47 |
| 2010/0075756 | A1* | 3/2010 | Roberts | A63F 13/10 463/39 |
| 2010/0144439 | A1* | 6/2010 | Watanabe | A63F 13/12 463/40 |

* cited by examiner

*Primary Examiner* — Allen Chan
(74) *Attorney, Agent, or Firm* — James M. Smedley LLC; James Michael Smedley, Esq.

(57) ABSTRACT

Embodiments of the present invention are generally directed towards software based controllers. Specifically, embodiments of the present invention are configured to provide a software based controller capable of utilization with games provided through a console, handheld device or other computing device.

13 Claims, 5 Drawing Sheets

SYSTEM AND METHOD FOR PROVIDING A SOFTWARE APPLICATION CONTROLLER

CROSS REFERENCE TO RELATED APPLICATIONS

This application claims the benefit of U.S. Provisional Patent Application No. 61/940,816, filed Feb. 17, 2014, the entire disclosure of which is incorporated herein by reference.

FIELD OF THE INVENTION

Embodiments of the present invention are generally directed towards software based controllers. Specifically, embodiments of the present invention are configured to provide a software based controller capable of utilization with games provided through a console, handheld device or other computing device.

BACKGROUND

Current game systems, whether comprising a console, handheld or other computing device, do not provide the ability to use non-native controllers. Additionally, certain console platforms (i.e., Android) do not allow for usage of third party or remotely attached controllers for the purpose of providing game control or integration.

These limitations prevent users from being able to pay games on such consoles or otherwise interact with these consoles with third-party or remote controllers.

Therefore, there is need in the art for systems and methods for providing a controller module capable of utilization with games provided through a console, handheld device or other computing device and allowing for interactive functionality therewith. These and other features and advantages of the present invention will be explained and will become obvious to one skilled in the art through the summary of the invention that follows.

SUMMARY OF THE INVENTION

Accordingly, it is an aspect of the present invention to providing a controller module capable of utilization with games provided through a console, handheld device or other computing device and allowing for interactive functionality therewith. The following is a summary for providing a solution to the problem in the form of a software application controller, comprising one or more software and hardware elements for the purpose of providing interaction between a hardware device (e.g., mobile computing device) and a remote console system (e.g., gaming system).

According to an embodiment of the present invention, a system for providing a software application controller comprises: a software application controller module, comprising computer-executable code stored in non-volatile memory, a controller output module, comprising computer-executable code stored in non-volatile memory a processor, one or more input means, and one or more output means, wherein said software application controller module, said controller output module, said processor, said one or more input means and said one or more output means are operably connected and are configured to: receive a console connection request; connect to said console via data provided by said console connection request; receive input from one or more of said one or more input means; transmit input data to said console based on said received input from said one or more input means; receive output data from said console; process output data from said console; and generate human perceptible output data usable by one or more of said one or more output means in order to provide output content.

According to an embodiment of the present invention, the console connection request engages a communicative connection between said console and software application control module for the purpose of providing data therebetween.

According to an embodiment of the present invention, the input means are selected from the group comprising touchscreen interfaces, keyboard interfaces, accelerometers, gyroscope, motion sensors, analog sticks, buttons, cameras, microphones and 3D imaging devices.

According to an embodiment of the present invention, processing output data from said console includes converting audio content from a first language into a second language.

According to an embodiment of the present invention, output data from said console is a first audio output content that is distinct from a second audio output from said console transmitted to a second software application controller.

According to an embodiment of the present invention, the output data from said console is unique output data that is distinct from output data transmitted to a second software application controller.

According to an embodiment of the present invention, the software application controller module, said controller output module, said processor, said one or more input means and said one or more output means are further configured to transmit a switch signal to said console wherein said switch signal provides for the switching of a first software application controller to a second software application controller for the purpose of providing a hot-seat controller switch.

According to an embodiment of the present invention, the software application controller module, said controller output module, said processor, said one or more input means and said one or more output means are further configured to transmit an audio switch command to said console, wherein said audio switch command switches output audio from an audio source connected to said console to one of the one or more output means.

According to an embodiment of the present invention, a method for providing a software application controller comprises the steps of: receiving a console connection request at a software application control module; connecting to said console via data provided by said console connection request; receiving input from one or more input means; transmitting input data to said console based on said received input from said one or more input means; receiving output data from said console; processing output data from said console; and generating human perceptible output data usable by one or more output means in order to provide output content.

According to an embodiment of the present invention, the console connection request engages a communicative connection between said console and software application control module for the purpose of providing data therebetween.

According to an embodiment of the present invention, the input means are selected from the group comprising touchscreen interfaces, keyboard interfaces, accelerometers, gyroscope, motion sensors, analog sticks, buttons, cameras, microphones and 3D imaging devices.

According to an embodiment of the present invention, the software application controller module, said controller output module, said processor, said one or more input means and said one or more output means are further configured to transmit a switch signal to said console wherein said switch signal provides for the switching of a first software application controller to a second software application controller for the purpose of providing a hot-seat controller switch.

According to an embodiment of the present invention, the software application controller module, said controller output module, said processor, said one or more input means and said one or more output means are further configured to transmit an audio switch command to said console, wherein said audio switch command switches output audio from an audio source connected to said console to one of the one or more output means.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

According to an embodiment of the present invention, the system and methods of the present invention may be achieved in part through the usage of a software application controller. In a preferred embodiment, games provided through a console, handheld device or other computing device may utilize the software application controller to replace physical controllers.

Figure 1:
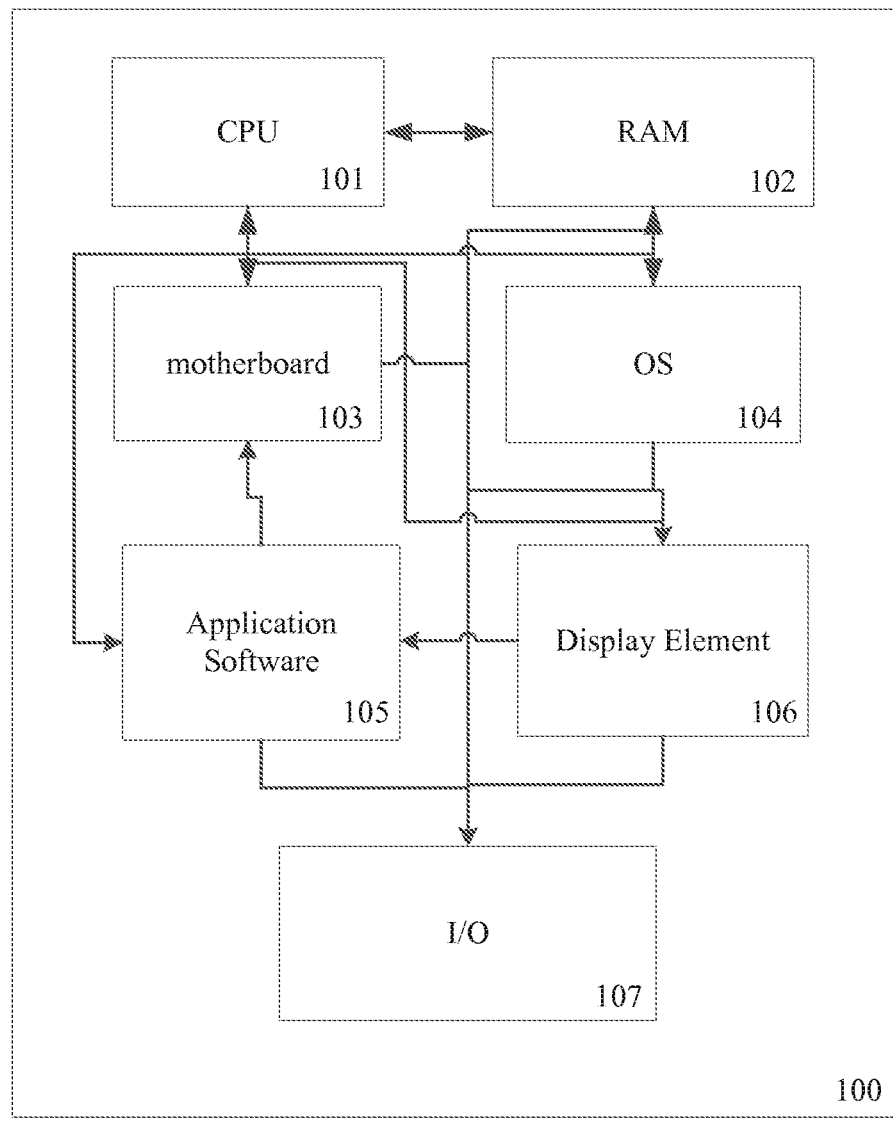
FIG. 1 illustrates a schematic overview of a computing device, in accordance with an embodiment of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, a display element 106 and one or more input/output devices/means 107. Examples of computing devices usable with embodiments of the present invention include, but are not limited to, personal computers, smart phones, laptops, mobile computing devices and tablet PCs and servers. One of ordinary skill in the art would understand that any number of computing devices could be used, and embodiments of the present invention are contemplated for use with any computing device.

In a preferred embodiment of the present invention, the computing devices utilized will incorporate one or more input means and output means for use and interaction with the system. Input means may include, but are not limited to, touchscreen interfaces, keyboard interfaces, accelerometers, gyroscope, motion sensors, analog sticks, buttons, cameras, microphones and 3D imaging devices, or any combination thereof. Output means may include, but are not limited to, video displays elements, audio output devices (e.g., speakers, headphones), haptic output means (e.g., force feedback devices) or any combination thereof. One of ordinary skill in the art would appreciate that there are numerous input means and output means that could be utilized with embodiments of the present invention, and embodiments of the present invention are contemplated for use with any such input means and output means.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2A:
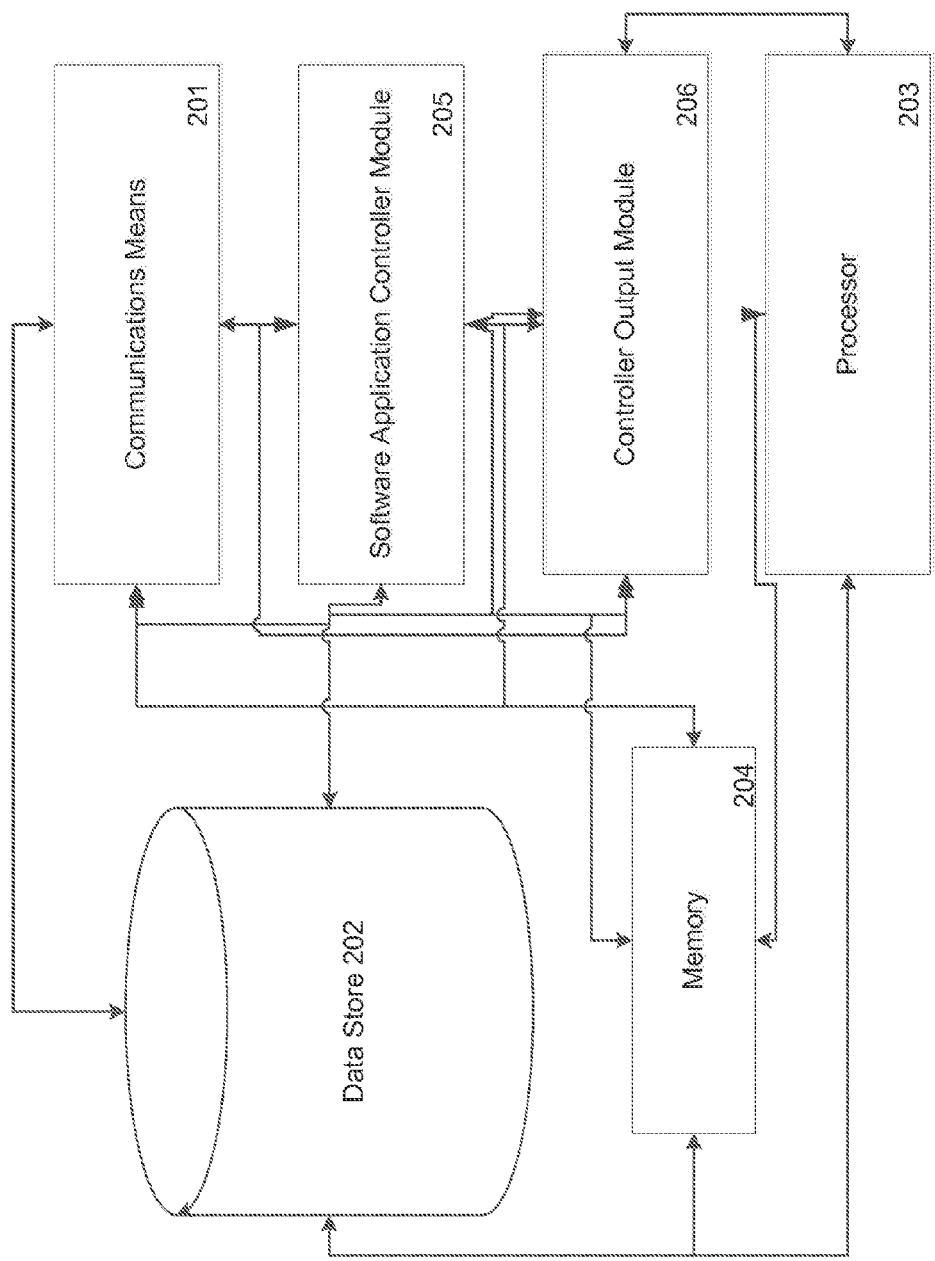
FIG. 2A illustrates a schematic of a system for providing a software controller, in accordance with an embodiment of the present invention.
Figure 2B:
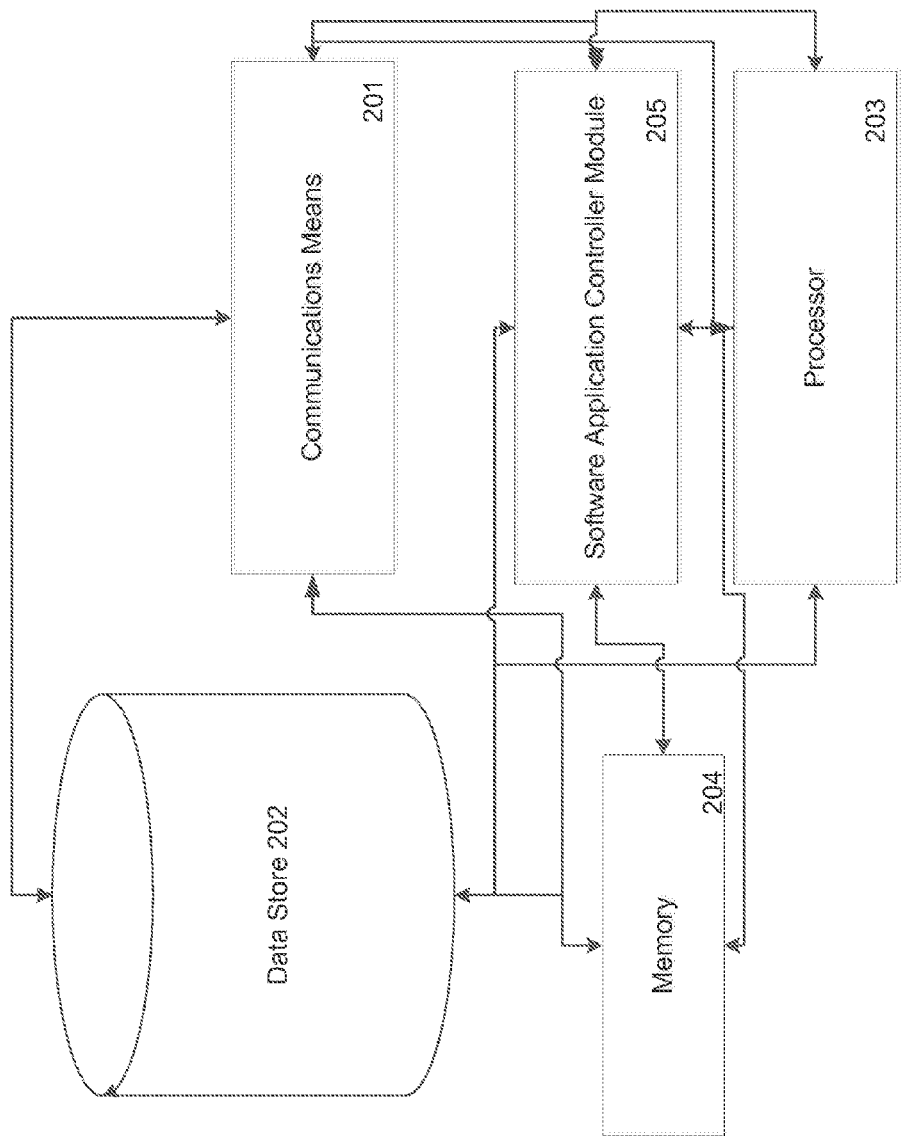
FIG. 2B illustrates a schematic of a system for providing a software controller, in accordance with an embodiment of the present invention.
Figure 2C:
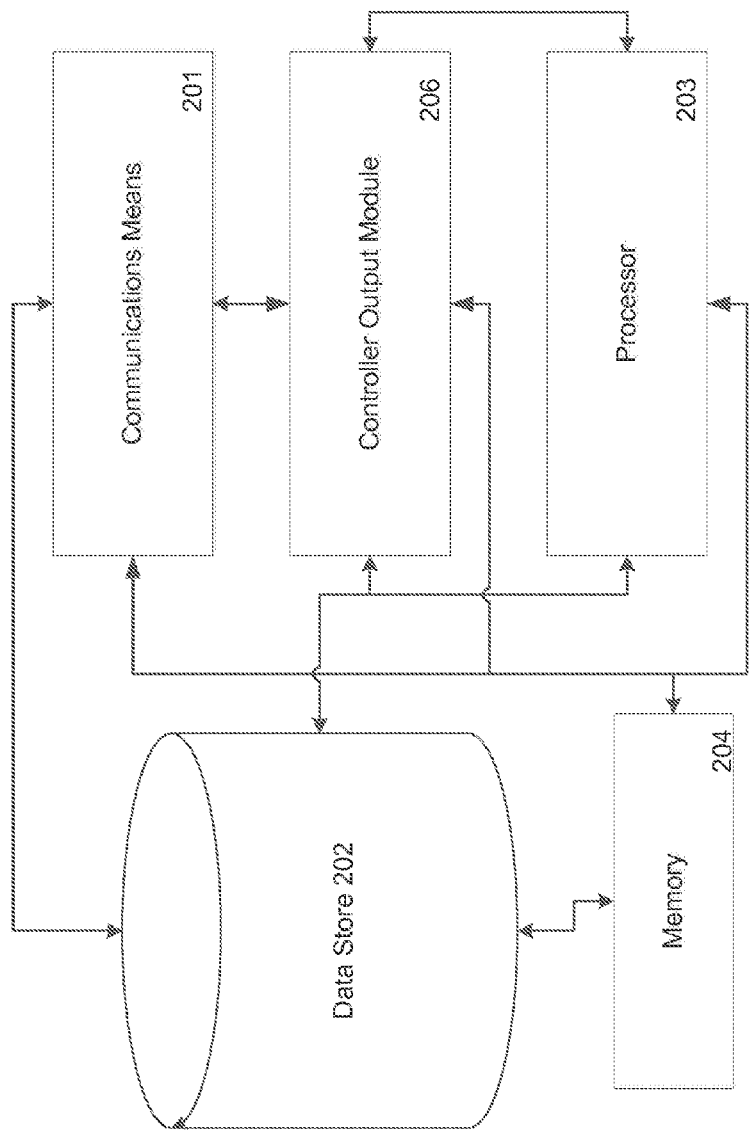
FIG. 2C illustrates a schematic of a system for providing a software controller, in accordance with an embodiment of the present invention.

Turning to FIG. 2A, according to an embodiment of the present invention, a system for providing a software application controller is comprised of one or more communications means 201, one or more data stores 202, a processor 203, memory 204, a Software Application Controller Module 405 and a Controller Output Module 406. In FIG. 2B, according to an embodiment of the present invention, a system for providing a software application controller is comprised of one or more communications means 201, one or more data stores 202, a processor 203, memory 204 and a Software Application Controller Module 205. In FIG. 2C, according to an embodiment of the present invention, a system for providing a software application controller is comprised of one or more communications means 201, one or more data stores 202, a processor 203, memory 204 and a Controller Output Module 206. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the Software Application Controller Module is configured to work in conjunction with the processor, memory, data store and communications means to provide a human interface device (HID) for a user of a gaming or other computing console or device. Preferred embodiments of the present invention are configured to allow the Software Application Control Module to act as a replacement for a standard gaming controller or allow for usage as a controller or other HID for applications that do not generally accept inputs from controllers or other HIDs. Functionality of the Software Application Control Module includes, but is not limited to, receiving communications from a console or other computing device, transmitting control events to a console or other computing device, converting user input from a mobile or other computing device the Software Control Module is used in conjunction with into control events or other data usable by a console or other computing device, or any combination thereof.

According to an embodiment of the present invention, the Controller Output Module is configured to work in conjunction with the processor, memory, data store and communications means to allow for the display output, audio output, tactile output or other output or combination of outputs from the Controller Output Module to applicable hardware components of the mobile or other computing device working in conjunction with the Controller Output Module. In this manner, the gaming system or console may provide output data to the computing device operating the software application controller in order to provide sound, video, haptic feedback or other output to the user of the software application controller.

According to an embodiment of the present invention, the system and methods described herein allow for the use of applications, such as those provided on a mobile phone or other computing device (e.g., smartphone, tablet PC) without the need to purchase an additional controller. This results in substantial savings to the customer and reduces production costs.

According to an embodiment of the present invention, the system is provided by way of a software application controller that provides access to the underlying hardware components of the mobile phone or other computing device in order to provide control elements not typically available in a commercial controller for a console or other gaming device. For instance, control elements not generally available in a controller, but available to a mobile phone or other computing device include, but are not limited to, gyros, accelerometers, capacitive touchscreens, near field communication (NFC) means, communication means (e.g., Bluetooth, WIFI, cellular modules), audio components (e.g., microphone, speakers) and global positioning systems (GPS). One of ordinary skill in the art would appreciate that there are numerous types of control elements that could be utilized with embodiments of the present invention, and embodiments of the present invention are contemplated for use with any type of control element. These control elements permit developers to develop new types of games for these mobile devices that can be specifically played with a software app controller that could not otherwise be played with a physical controller.

According to an embodiment of the present invention, the system may provide the ability to connect several software application controllers at the same time and control console or play hotseat/multiplayer for two joy stick games. There are currently no hotseat games on Android devices. Software application controllers can be used to play multiplayer games and developers can develop multiplayer games specifically for software controllers.

According to an embodiment of the present invention, the system may provide the ability to provide audio from the gaming system or console via the software application controller on the mobile phone or other computing device utilizing the software application controller. Additionally, the software application controller can be configured to control the audio on the TV (e.g., mute, increase volume, decrease volume) and receive audio data for listening to the audio from the TV (or other device) via a mobile device. In this manner, the software application controller, in conjunction with the mobile phone or other computing device, may allow for a more integrated gaming experience, such as providing voice commands or communications to specific software application controllers. For instance, in a multiplayer game, audio only audible to certain players may be played on the audio components of those player's software application controllers. This feature may allow for multiple software application controllers to be used in parallel (i.e., simultaneously with a single gaming system or console) wherein each software application controller receives different audio data specific to their interaction with the game (e.g., different sounds depending on location, providing audio only to a subset of users to which the audio data should be audible). In other embodiments, control of the audio may allow for a player to watch TV or play games and not disturb others (e.g., via plugging in headphones into the mobile phone).

According to an embodiment of the present invention, The software application controller can be further configured to allow for audio output from a device to be configured or otherwise interpreted for a particular user. For instance, a gaming system or console could be aware that the user of a software application controller has a native language that is different that the default language utilized on a main audio output of the gaming system or console (e.g., stereo, TV audio). The gaming system or console could be made aware of the language difference by settings or configuration information transmitted to the gaming system or console by the software application controller. In response, the gaming system or console could transmit audio output data to the software application controller in the appropriate language for the user so that the user's computing device could play the audio output data for that user. In this manner, various players can play the same game on the same gaming system or console and be provided audio content in their own native language. Alternatively, the gaming system or console could provide audio data to the software application controller and the software application controller could select appropriate audio data for playback on the computing device of the user, such as via stored audio packs in a language different than the current game is utilizing.

According to an embodiment of the present invention, similarly to the ability to provide unique audio data, the system may be configured to provide unique output video data to one or more software application controllers connected to a gaming system or console. For instance, in a multiplayer game, a first user may be provided a cut-scene or other video content (or multimedia content) unique to the first such that other users are not interrupted on a main display attached to the gaming system or console (e.g., TV) or interrupted on their own software application controller. This allows for users to have unique experiences with a game without interrupting gameplay for others. The same process can be applied to other output content data types, such as haptic feedback, thus allowing for unique gaming experiences for multiplayer setups through use of embodiments of the present invention, including through use of multiple software application controllers connected to a single gaming system or console.

Continuing with respect to multiple software application controllers being utilized with a single gaming system or console, such setups allow for other advantageous implementations and functionalities. For instance, having multiple software application controllers attached to a gaming system or console can provide users the ability to hot-seat a game where hot-seating was otherwise not allowable or possible. Hot-seating is where one player switches control of the game to a second player so the second player can take over playing the game currently active on the gaming system. With the utilization of a plurality of software application controllers, users can swap control between players with ease, even where an underlying game would not otherwise permit hot-seating. This could be accomplished, for instance, through providing a communications link between two or more software application controllers such that when a hot-seat switch is requested, the software application controllers swap control between the software application controllers (e.g., swap identifiers used to connect with the gaming system or console such that the gaming system or console believes the second software application controller is actually the first software application controller that was originally playing the game). As such, the gaming system or console can be completely oblivious to the entire hot-seating process.

According to an embodiment of the present invention, the system may stream audio to several/multiple software remotes at the same time. In this configuration, users can prevent disturbing others in the same room or in the vicinity. Those desiring to hear the auto can connect their software application controller to the system in order to listen to audio.

According to an embodiment of the present invention, the system may further be configured with the ability to provide streaming video from a video source (e.g., TV, set top box (STB), home theater PC (HTPC)) back to the software application controller to give the user the ability to play from TV and from the software application controller. Advantageously, users can take content with them wherever they go (e.g., watching a movie and a friend needs to leave the friend can watch the rest of the movie on the mobile app without the user watching the movie on TV having to pause and wait for the friend's return).

For example, if a user is in main menu on a TV to choose a menu item, doing so requires the user to get out of a game or menu. With a software application controller, the user can see a copy of the menu on the software application controller (e.g., displayed on a mobile computing device) and click that without disturbing the menu or game the user is in. This works for games themselves if the user wants to move to another level on the user's mobile device and the user moves within the game, but the user would be limited with respect to the menu item. If the user plays the game on a TV the user will not have a tactile sensation. On mobile device they will have more tactile and clearer spatial sense of the menu and menu items.

According to an embodiment of the present invention, the software application controller can be configured to act as a remote screen for displaying secondary content via the mobile phone or other computing device. Secondary content may be, for instance, a TV guide from a STB that is displaying primary content (e.g., a TV show) on a television. In this manner, software application controller can allow for display and interaction with secondary content without disturbing the primary content. For instance, if a user is watching a movie on the TV and wants to see what else is available, the user can check it on the software application controller without minimizing the movie on the TV screen. Then when you find something you want to watch, just touch the icon of the movie and it will switch the movie on the TV without ever having affected the original TV view.

According to an embodiment of the present invention, the software application controller can be configured emulate one or more control elements (e.g., gyro, accelerometer and a multi touch screen) as if implemented into an android device. Using a mobile phone or other computing device as an external accelerometer, gyro and multi touch screen allows a user to play games via the software application controller which provides features not available in current physical controllers.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Exemplary Embodiments

Figure 3:
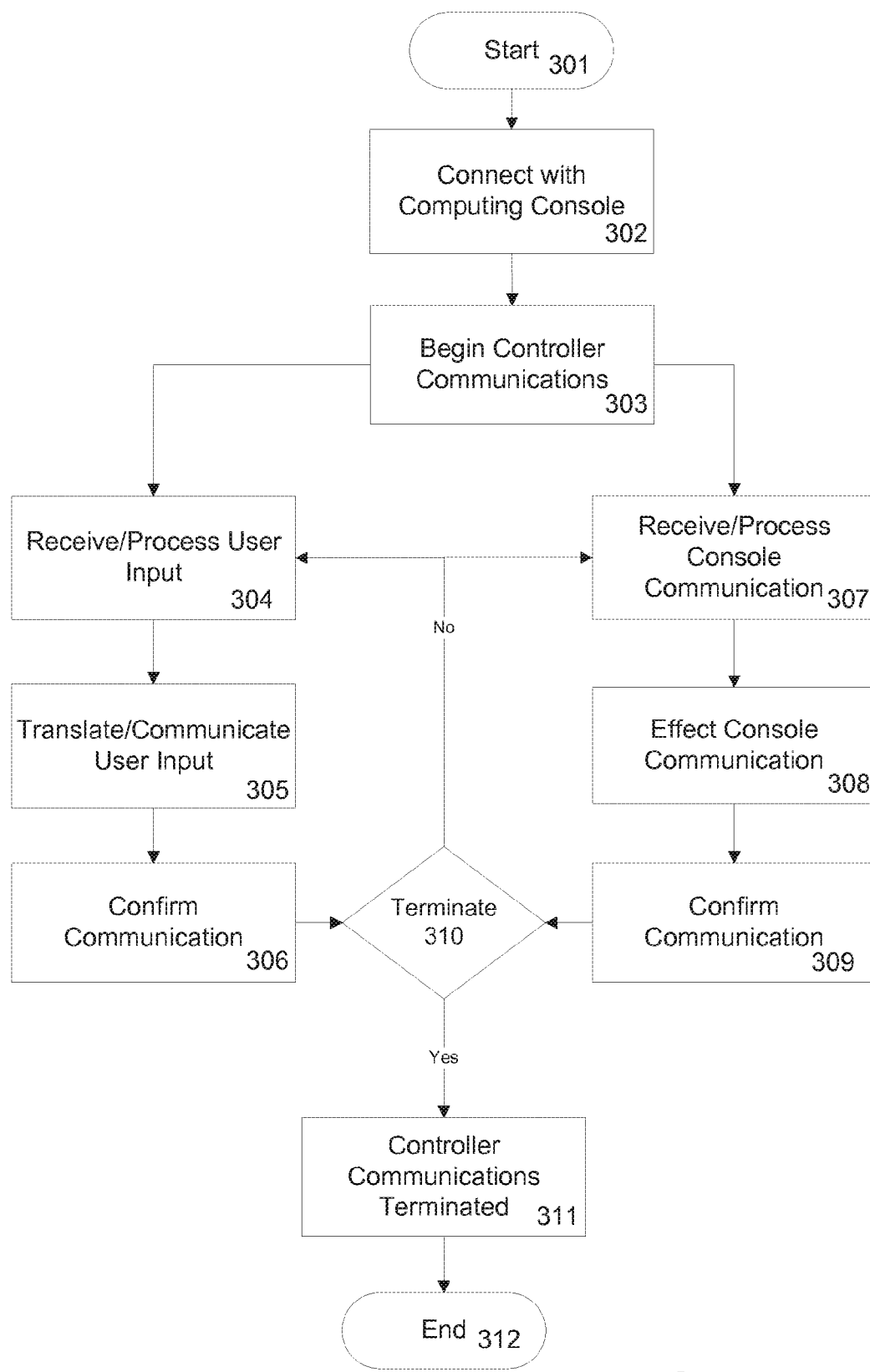
FIG. 3 is a process flow of an exemplary method in accordance with embodiments of the present invention.

Turning now to FIG. 3, an exemplary method for providing a software application controller is shown. The process starts at Step 301 with a user initiating a software application controller on their mobile or other computing device. At Step 302, the system attempts to connect with a gaming system or other computing console (collectively or individually referred to for the purposes of this exemplary method, "computing console") for interaction therewith.

At step 303, the system begins communicating with the computing console such that the system can transmit and receive controller and/or game data in accordance with the system and methods described herein.

At step 304, the system receives input data from one or more of the input means attached to the software application controller module. As noted above, this could be from any number of input sources, such as a touchscreen, accelerometer, gyroscope, microphone, camera or other input source or input means.

At step 305, the system translates the input into input data and communicates the input data to the computing console for usage as input data with respect to a game or other operation occurring on the computing console. Optionally, at step 306, the system may confirm transmission and receipt of the input data by the computing console.

Concurrently with the input process, the system may be configured to receive and process console communications from the computing console (Step 307). Such communications are processed and effected on the computing device associated with the controller output module (Step 308). In a preferred embodiment of the present invention, effecting console communications means providing output content or output data to one or more of the output means or output devices associated with the computing device operating in conjunction with the controller output module. Optionally, at Step 309, the system can confirm to the console that the console communications were received and effectively processed.

At step 310, the system checks to see if there is a termination request from either the system or the computing console. If no termination occurs, the system repeats the process of receiving and transmitting input and output between the system and the computing console. If there is a termination request, the system processes the termination of communications (Step 11) and the process terminates at step 312.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for providing a software application controller, the system comprising:
a software application controller module, comprising computer-executable code stored in non-volatile memory,
a controller output module, comprising computer-executable code stored in non-volatile memory
a processor,
one or more input means, and
one or more output means,
wherein said input means are selected from the group comprising touchscreen interfaces, accelerometers, gyroscope, motion sensors, cameras, microphone, and 3D imaging devices,
wherein said software application controller module, said controller output module, said processor, said one or more input means and said one or more output means are operably connected and are configured to:
receive a console connection request;
connect to said console via data provided by said console connection request;
receive input from one or more of said one or more input means;
transmit input data to said console based on said received input from said one or more input means;
receive output data from said console;
process output data from said console; and
generate human perceptible output data usable by one or more of said one or more output means in order to provide output content, and
transmit a switch signal to said console wherein said switch signal provides for the swapping of control of said console from a first software application controller to a second software application controller thereby providing a hot-seat controller switch such that said console is agnostic with regard to which software application controller controls said console.

2. The system of claim 1, wherein said console connection request engages a communicative connection between said console and software application control module for the purpose of providing data therebetween.

3. The system of claim 1, wherein processing output data from said console includes converting audio content from a first language into a second language.

4. The system of claim 1, wherein output data from said console is a first audio output content that is distinct from a second audio output from said console transmitted to a second software application controller.

5. The system of claim 1, wherein output data from said console is unique output data that is distinct from output data transmitted to a second software application controller.

6. The system of claim 1, wherein said software application controller module, said controller output module, said processor, said one or more input means and said one or more output means are further configured to transmit an audio switch command to said console, wherein said audio switch command switches output audio from an audio source connected to said console to one of the one or more output means.

7. A method for providing a software application controller, the method comprising the steps of:
receiving a console connection request at a software application control module;
connecting to said console via data provided by said console connection request;
receiving input from one or more input means selected from the group comprising touchscreen interface, accelerometers, gyroscope, motion sensor, cameras, microphone, and 3D imaging devices;
transmitting input data to said console based on said received input from said one or more input means;
receiving output data from said console;
processing output data from said console;
generating human perceptible output data usable by one or more output means in order to provide output content; and
transmitting a switch signal to said console wherein said switch signal provides for the swapping of control of said console from a first software application controller to a second software application controller thereby providing a hot-seat controller switch such that said control is agnostic with regard to which software application controller controls said console.

8. The method of claim 7, wherein said console connection request engages a communicative connection between said console and software application control module for the purpose of providing data therebetween.

9. The method of claim 7, wherein said input means are selected from the group comprising touchscreen interfaces, keyboard interfaces, accelerometers, gyroscope, motion sensors, analog sticks, buttons, cameras, microphones and 3D imaging devices.

10. The method of claim 7, wherein processing output data from said console includes converting audio content from a first language into a second language.

11. The method of claim 7, wherein output data from said console is a first audio output content that is distinct from a second audio output from said console transmitted to a second software application controller.

12. The method of claim 7, wherein output data from said console is unique output data that is distinct from output data transmitted to a second software application controller.

13. The method of claim 7, wherein said software application controller module, said controller output module, said processor, said one or more input means and said one or more output means are further configured to transmit an audio switch command to said console, wherein said audio switch command switches output audio from an audio source connected to said console to one of the one or more output means.

* * * * *